F. WILKINSON.
COASTER BRAKE.
APPLICATION FILED JUNE 1, 1914.

1,133,774.

Patented Mar. 30, 1915.

Witnesses.
H. L. Trimble.
E. Herow

Inventor.
Frederick Wilkinson,
by H. J. S. Dennison, Atty

UNITED STATES PATENT OFFICE.

FREDERICK WILKINSON, OF TORONTO, ONTARIO, CANADA.

COASTER-BRAKE.

1,133,774.  Specification of Letters Patent.  Patented Mar. 30, 1915.

Application filed June 1, 1914. Serial No. 842,076.

*To all whom it may concern:*

Be it known that I, FREDERICK WILKINSON, a subject of the King of Great Britain, and resident of the city of Toronto, county of York, Province of Ontario, in the Dominion of Canada, have invented certain new and useful Improvements in Coaster-Brakes, described in the following specification and illustrated in the accompanying drawings, that form part of the same.

The principal object of the invention is to provide a brake which may be positively actuated and will be extremely efficient in its operation and in which there will be no loose parts which can possibly get out of place and prevent the proper operation in applying or releasing the brake.

Further and important objects of the present invention are to devise a form of brake in which the number of parts is greatly reduced and such parts are of simple construction and may be manufactured at very low cost.

The principal feature of the invention consists in the novel construction and arrangement of parts, whereby the positive actuation of the braking member in applying or releasing the brake is insured and the operating parts are positively held from dislocation.

Figure 1:
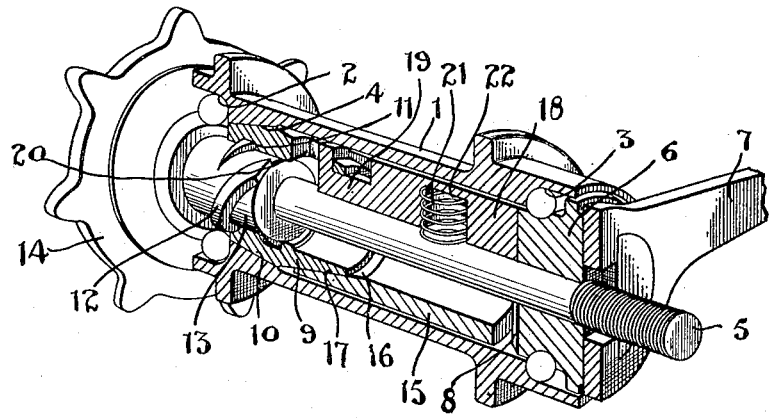
Figure 2:
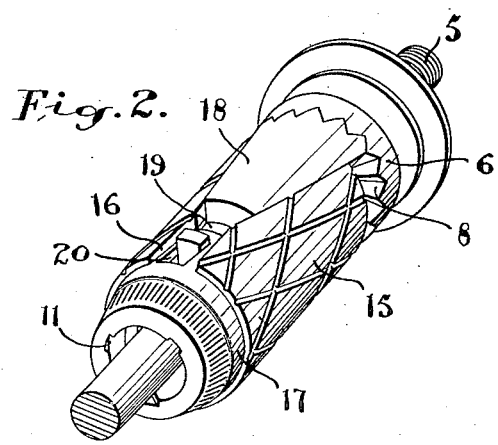
Figure 3:
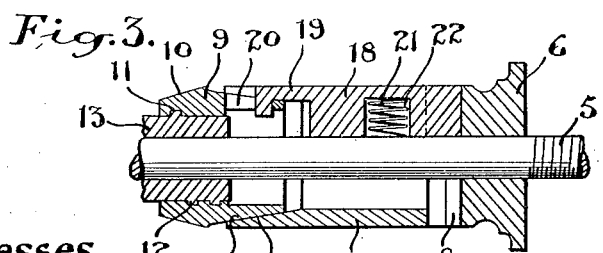

In the drawings, Figure 1 is a longitudinal sectional perspective view of a wheel hub showing the application of my invention thereto. Fig. 2 is a perspective detail showing the axle, brake sleeve and expanding member removed from the hub. Fig. 3 is a longitudinal sectional view showing a slight modification in the form of the members for expanding the brake sleeve.

Like numerals of reference indicate corresponding parts in each figure.

Referring to the drawings, 1 is the wheel hub formed with ball races 2 and 3 at the ends and a converging frictional surface 4 on its inner wall at the sprocket end.

5 is the axle having the stationary cone member 6 mounted thereon, said stationary member being held from rotation by the anchor 7 secured to its outer end. The inner end face of the cone member 6 is formed with a plurality of radial serrations 8.

9 is a double cone clutch sleeve arranged within the wheel hub and having the tapered end 10 adapted to engage the tapered friction surface 4 of the hub and forming the wheel clutch. The interior wall of said sleeve is formed with the spiral grooves 11 into which the spiral threads 12 of the sleeve member 13 connected to the sprocket 14 extend.

15 is an expansible brake sleeve which is formed of suitable spring friction material and is split longitudinally from end to end and formed with the inner end wall 16 tapered to fit the tapered end 17 of the sleeve 9. The slot in the brake sleeve is flared outwardly to receive the wedge member 18, which member is formed with a narrow extension end 19 formed in hook shape adapted to extend into an orifice 20 formed in the tapered end 17 of the sleeve 9. The hook-shaped member when thus engaging the sleeve 9 holds the said sleeve 10 and the expanding brake sleeve together. The wedge 18 rests loosely upon the axle and its outer end projects beyond the brake sleeve and is shaped with a plurality of radial serrated teeth adapted to engage the serrated face of the stationary member 6.

In Fig. 3 I have shown a slight modification in the form of the wedge member 18 in that the hook end extends inwardly into the orifice in the sleeve 9, whereas in the form shown in Figs. 1 and 2 the hook end extends from the inside outwardly.

In the operation of this device, when the sprocket is driven forwardly the spiral threads on the sprocket sleeve force the sleeve 9 into frictional engagement with the tapered surface of the hub, thus forming the driving contact with the wheel. Immediately on the release of the forward pressure upon the sprocket wheel the clutch sleeve 9 releases from the hub allowing it to turn freely.

When it is desired to apply the brake the backward movement of the sprocket forces the sleeve 9 inwardly through the operation of the spirals. The inward movement of the sleeve 9 pushes the brake sleeve member toward the stationary member 6 and the wedge 18 is carried with said sleeve until the serrated end of said wedge engages the serrated face of said stationary member. The inward pressure of the tapered end 17 of the sleeve 9 against the tapered end wall 16 of the brake sleeve expands the brake sleeve and coincidently the end pressure of the wedge member against the tapered sides of the longitudinal slot expands the sleeve until the outer surface thereof is brought into contact with the inner wall of the hub, thereby applying the brake.

The hook end of the wedge member 18 has sufficient latitude of movement longitudinally to allow the wedge to move freely in expanding the brake sleeve but it forms a positive connection between the sleeve 9 and wedge so that upon the release of the backward pressure of the sprocket, the wedge may be moved freely to release the brake and upon the forward movement of the sprocket the sleeve 9 draws the serrated end of the wedge member out of engagement with the stationary engaging member 6.

The dead weight of the brake sleeve and wedge resting upon the axle are sufficient to prevent any backward rotation of the sleeve 9 on the thrust of the spirals but I have shown herein an additional safety feature in the use of a spiral spring 21 arranged within a recess 22 formed in the underside of the wedge member 18 and engaging the axle.

It will be noted that the number of parts of the brake operating mechanism are reduced to three. These are of very simple, strong and durable construction. There are no delicate parts to get out of order and no pins or screws or small parts of any kind which can become dislocated and effect the working mechanism and as the brake sleeve is expanded from one end for the major portion of its length by means of the wedge and at the other end simultaneously by the tapered end of the sleeve 9 a perfect braking contact for the entire length of the brake shoe is assured.

A brake constructed as described responds very quickly both in application and release and is absolutely adaptable to operating at all times and the cost of manufacture is very greatly reduced. Further, it is very simple and easy to handle in assembling as all the parts can be connected together and put in place at once.

What I claim as my invention is:—

1. In a coaster brake, the combination with the hub and axle, of an expanding brake sleeve arranged within the hub, a wedge member slidably supported and adapted to expand said brake sleeve, a stationary member adapted to engage said wedge and to hold it from rotation during the expanding of the sleeve, and means adapted to move said wedge member into and out of contact with said stationary engaging member.

2. In a coaster brake, the combination with the hub and axle, of an expanding brake sleeve arranged within the hub and split longitudinally, a wedge member extending into the longitudinal split in said brake sleeve from one end and projecting beyond the end thereof, a clutch sleeve adapted to engage the hub to rotate it forwardly and extending into said expanding brake sleeve and operatively connected to said wedge and adapted to move the said sleeve into expanding contact and with said wedge, and a stationary member supported on the axle adapted to engage the outer end of said wedge and to arrest it from rotation.

3. In a coaster brake, the combination with the hub, axle and sprocket sleeve, of a clutch sleeve mounted on said sprocket sleeve adapted to frictionally engage the hub, a slotted expanding brake sleeve extending over the inner end of said clutch sleeve, a wedge member arranged in the slot in said brake sleeve and extending beyond the free end thereof, said wedge having a projecting member engaging said clutch sleeve, and a stationary member mounted on said axle adapted to engage the outer end of said wedge to hold it from rotation.

4. In a coaster brake, the combination with the hub, axle and sprocket sleeve, of a clutch sleeve mounted on said sprocket sleeve adapted to frictionally engage the hub and having a tapered inner end and an orifice in said tapered end, an expanding brake sleeve formed with a tapered end extending over the tapered end of said clutch member, said expanding sleeve having a tapered longitudinal slot, a wedge member fitting in the slot in said expanding sleeve and extending beyond the free end thereof and having a toothed outer end and a hook shaped inner end adapted to extend into the orifice in said clutch sleeve, and a stationary toothed member adapted to engage the projecting toothed end of said wedge to hold said wedge and brake sleeve from rotation on the application of the brake.

Signed at the city of Toronto, Ontario, Canada, this 28th day of May, 1914.

FREDERICK WILKINSON.

Witnesses:
H. L. TRIMBLE,
D. S. TOVELL.